(12) United States Patent
Pursifull (10) Patent No.: US 12,043,261 B2
(45) Date of Patent: *Jul. 23, 2024

(54) METHODS AND APPARATUS TO PERFORM A TANK TURN

(71) Applicant: Ford Global Technologies, LLC, Dearborn, MI (US)

(72) Inventor: Ross Dykstra Pursifull, Dearborn, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 18/173,514

(22) Filed: Feb. 23, 2023

(65) Prior Publication Data

US 2023/0202483 A1   Jun. 29, 2023

Related U.S. Application Data

(63) Continuation of application No. 17/072,789, filed on Oct. 16, 2020, now Pat. No. 11,597,392.

(51) Int. Cl.
*B60G 3/00* (2006.01)
*B60G 17/016* (2006.01)
(Continued)

(52) U.S. Cl.
CPC ............ *B60W 30/188* (2013.01); *B60G 3/00* (2013.01); *B60G 17/0162* (2013.01); *B60K 1/02* (2013.01);
(Continued)

(58) Field of Classification Search
CPC ... B60W 30/188; B60G 3/00; B60G 17/0162; B60G 2400/60; B60G 2400/61;
(Continued)

(56) References Cited

U.S. PATENT DOCUMENTS 6,312,065 B1   11/2001   Freitag et al.
11,597,392 B2 *  3/2023   Pursifull ............... B60K 35/00
(Continued)

FOREIGN PATENT DOCUMENTS

JP   2009107390   5/2009
WO   9006252      6/1990

OTHER PUBLICATIONS

United States Patent and Trademark Office, "Non-Final Office Action," issued Jul. 20, 2022 in connection with U.S. Appl. No. 17/072,789, 13 pages.
(Continued)

*Primary Examiner* — Jason D Shanske
*Assistant Examiner* — Daniel M. Keck
(74) *Attorney, Agent, or Firm* — Lorne Forsythe; Hanley, Flight & Zimmerman, LLC (57) ABSTRACT

Methods, apparatus, systems and articles of manufacture are disclosed to perform a tank turn. An example apparatus includes programmable circuitry to determine that a first brake associated with a first wheel is engaged and a second brake associated with a second wheel is engaged, the first wheel located on an end of a first axle of a vehicle, the second wheel located on an end of a second axle of the vehicle, the end of the first axle opposite to the end of the second axle, cause a first suspension to decrease a first suspension load of the first wheel, cause a second suspension to decrease a second suspension load of the second wheel, cause a first motor to drive the first axle in a first direction, and cause a second motor to drive the second axle in a second direction, the second direction different from the first direction.

20 Claims, 6 Drawing Sheets

(51) Int. Cl.
  *B60K 1/02* (2006.01)
  *B60K 35/00* (2024.01)
  *B60K 35/10* (2024.01)
  *B60W 30/188* (2012.01)
  *B62D 7/14* (2006.01)
  *B62D 7/15* (2006.01)

(52) U.S. Cl.
  CPC .............. *B60K 35/00* (2013.01); *B62D 7/146* (2013.01); *B62D 7/1509* (2013.01); *B62D 7/1563* (2013.01); *B60G 2400/60* (2013.01); *B60K 35/10* (2024.01); *B60K 2360/11* (2024.01)

(58) Field of Classification Search
  CPC .......... B60G 2202/152; B60G 17/0521; B60G 2300/50; B60G 2600/20; B60K 1/02; B60K 35/00; B60K 2370/11; B60K 2370/12; B62D 7/146; B62D 7/1509; B62D 7/1563; B62D 15/00
  See application file for complete search history.

(56) References Cited

U.S. PATENT DOCUMENTS

| | | |
|---|---|---|
| 2015/0115562 A1 | 4/2015 | Grimm |
| 2017/0282970 A1 | 10/2017 | Yanez |
| 2020/0148255 A1 | 5/2020 | Korsch et al. |
| 2020/0247245 A1 | 8/2020 | Schepmann et al. |
| 2021/0347257 A1* | 11/2021 | Zalewski ............. B60K 17/356 |
| 2021/0347258 A1 | 11/2021 | Brammer et al. |
| 2021/0370739 A1 | 12/2021 | Seo |
| 2022/0105775 A1 | 4/2022 | Han et al. |
| 2022/0118979 A1 | 4/2022 | Pursifull |
| 2022/0219676 A1* | 7/2022 | Cao ..................... B60W 30/045 |

OTHER PUBLICATIONS

United States Patent and Trademark Office, "Notice of Allowance," issued Nov. 2, 2022 in connection with U.S. Appl. No. 17/072,789, 5 pages.

* cited by examiner

METHODS AND APPARATUS TO PERFORM A TANK TURN

RELATED APPLICATION

This patent arises from a continuation of U.S. patent application Ser. No. 17/072,789, filed on Oct. 16, 2020, which is incorporated by reference herein in its entirety.

FIELD OF THE DISCLOSURE

This disclosure relates generally to vehicle control and, more particularly, to methods and apparatus to perform a tank turn.

BACKGROUND

In recent years, vehicle control systems have developed to control vehicle operations such as, for example, engage and/or disengage a brake, increase and/or decrease suspension load, turn a steering wheel, etc., with minimal user interaction. Such vehicle control operations can be implemented to manipulate a vehicle (e.g., steer a wheel, engage a motor, etc.) to perform operations such as, for example, a parallel park movement, a reverse movement, etc.

SUMMARY

An example vehicle includes a first wheel and a second wheel, the first wheel located on an end of a first axle, the second wheel located on an end of a second axle, the end of the first axle opposite to the end of the second axle, a first suspension coupled to the first wheel, a second suspension coupled to the second wheel, and a controller to drive the first axle in a first direction, drive the second axle in a second direction, the first direction different from the second direction, and decrease a first suspension load of the first suspension and a second suspension load of the second suspension.

An example non-transitory computer readable medium includes instructions which, when executed, cause at least one processor to: determine whether an indication to perform a tank turn is obtained, and in response to determining the indication to perform the tank turn is obtained: decrease a first suspension load of a first suspension coupled to a first wheel, and decrease a second suspension load of a second suspension coupled to a second wheel, the first wheel located on an end of a first axle, the second wheel located on an end of a second axle, the end of the first axle opposite to the end of the second axle.

An example method includes determining whether an indication to perform a tank turn is obtained, and in response to determining the indication to perform the tank turn is obtained: decreasing a first suspension load of a first suspension coupled to a first wheel, and decreasing a second suspension load of a second suspension coupled to a second wheel, the first wheel located on an end of a first axle, the second wheel located on an end of a second axle, the end of the first axle opposite to the end of the second axle.

The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular. In general, the same reference numbers will be used throughout the drawing(s) and accompanying written description to refer to the same or like parts. As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time +/−1 second.

DETAILED DESCRIPTION

Some vehicles such as, for example, automobiles, are equipped with electric motors rather than traditional combustion engines. As a result, such vehicles can perform operational maneuvers not traditionally available. For example, these vehicles can, when in operation, drive (a) the front left wheel and the rear left wheel in a first direction and (b) the front right wheel and the rear right wheel in a second direction. In this manner, the vehicle may perform a tank turn. As used herein, a tank turn refers to a skid steer. For example, a counterclockwise tank turn refers to a skid steer maneuver in a counterclockwise direction. Likewise, a clockwise tank turn refers to a skid steer maneuver in a clockwise direction.

However, the above-mentioned maneuver operates using four individual motors (e.g., electric motors) configured to drive each wheel (e.g., the front left wheel, the front right wheel, the rear left wheel, and the rear right wheel) of a four-wheeled vehicle. In some examples, a vehicle may be equipped with (a) a first electric motor to drive a first axle, thus driving a front left wheel and a front right wheel and (b) a second electric motor to drive a second axle, thus driving a rear left wheel and a rear right wheel.

Examples disclosed herein include methods and apparatus to perform a tank turn using a two-motor vehicle. Examples disclosed herein include determining whether an indication to perform a tank turn is obtained, and in response to determining the indication to perform the tank turn is obtained, engaging a first brake associated with a first wheel, engaging a second brake associated with a second wheel, the first wheel located on an end of a first axle, the second wheel located on an end of a second axle, the end of the first axle opposite to the end of the second axle. Additionally, examples disclosed herein include decreasing a first suspension load of a first suspension coupled to the first wheel, and decreasing a second suspension load of a second suspension coupled to the second wheel.

Figure 1:
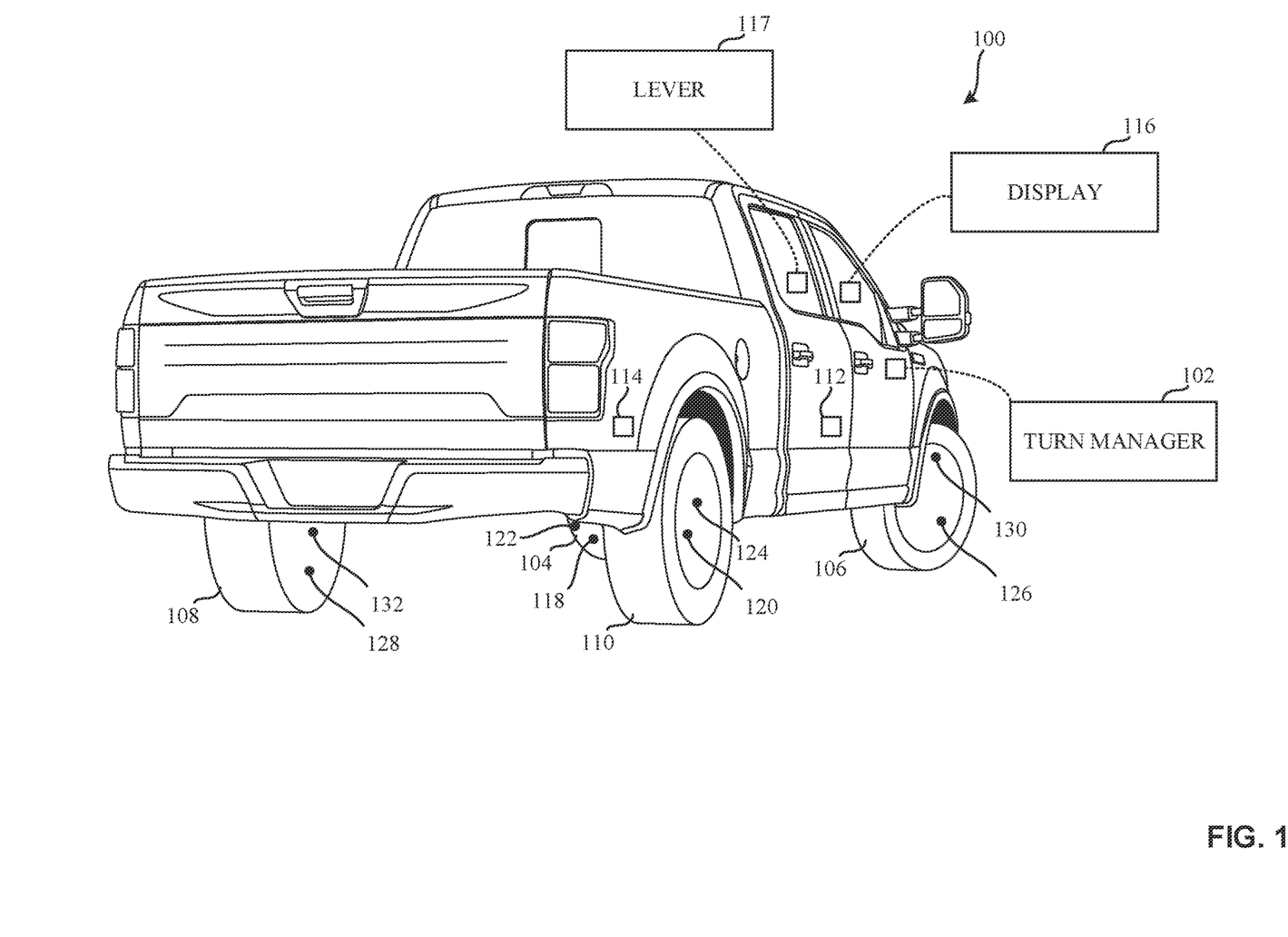
FIG. 1 illustrates an example vehicle including an example turn manager implemented in accordance with the teachings of this disclosure.

FIG. 1 illustrates an example vehicle 100 including an example turn manager 102 implemented in accordance with the teachings of this disclosure. The vehicle 100 further includes a first example front wheel 104, a second example front wheel 106, a first example rear wheel 108, and a second example rear wheel 110.

In the illustrated example of FIG. 1, the vehicle 100 is a consumer automobile. For example, the vehicle 100 of FIG. 1 is a consumer truck. In other examples, the vehicle 100 can be a commercial truck, a motorcycle, a motorized cart, an all-terrain vehicle, a motorized scooter, a locomotive, a consumer automobile, or any other vehicle. In the example of FIG. 1, the vehicle 100 includes an example first motor 112 and an example second motor 114. The first motor 112 and the second motor 114 are electric motors configured to drive a front axle (e.g., an axle to which the first front wheel 104 and the second front wheel 106 are coupled) and a rear axle (e.g., an axle to which the first rear wheel 108 and the second rear wheel 110 are coupled) of the vehicle 100, respectively. In other examples disclosed herein, the first motor 112 may be any suitable motor configured to drive a front axle (e.g., an axle to which the first front wheel 104 and the second front wheel 106 are coupled) of the vehicle 100. Likewise, in other examples disclosed herein, the second motor 114 may be any suitable motor configured to drive a rear axle (e.g., an axle to which the first rear wheel 108 and the second rear wheel 110 are coupled) of the vehicle 100.

The turn manager 102 is communicatively coupled to an example display 116. In this manner, the turn manager 102 determines whether an indication to perform a tank turn is obtained. For example, the display 116 can be within an interior of the vehicle 100 (e.g., a dashboard display, an overhead display, etc.) implemented as a graphical user interface (GUI). Additionally or alternatively, the display 116 can be a physical button or switch included within the interior of the vehicle 100 and/or included in a mobile device (e.g., a smartphone, a tablet, a smartwatch, etc.) of an operator or a passenger of the vehicle 100. In some examples, the display 116 can display an option to perform a tank turn, to be determined by the turn manager 102. For example, the display 116 can present a selection to a user of the vehicle 100 that, when selected, indicates to the turn manager 102 to perform a tank turn. In some examples, additionally or alternatively, the turn manager 102 is communicatively coupled to an example lever (e.g., shift lever, direction lever, gear selector) 117 of the vehicle 100. In such examples, the lever 117 can be configured so that the turn manager 102 determines that a tank turn is to be performed in response to the user of the vehicle 100 twisting and/or deflecting the lever 117.

In operation, the turn manager 102 is configured to, in response to determining that a user of the vehicle 100 has indicated to perform a tank turn, determine whether the desired tank turn is a clockwise tank turn, or a counterclockwise tank-turn. For example, a user of the vehicle 100 may select, via the display 116, to perform a clockwise tank turn. In the event the turn manager 102 determines that the desired tank turn is a clockwise tank turn, the turn manager 102 engages example brakes 126, 128 of the second front wheel 106 and the first rear wheel 108, respectively. Additionally, the turn manager 102 is configured to decrease a suspension load of example suspensions 130, 132 of the second front wheel 106 and the first rear wheel 108, respectively, in response to engaging the example brakes 126, 128. In addition to engaging the example brakes 126, 128 and decreasing the suspension load of the suspensions 130, 132, the turn manager 102 is configured to drive the first motor 112 forward, thus driving the first front wheel 104 and the second front wheel 106 forward. Additionally, the turn manager 102 is configured to drive the second motor 114 in reverse, thus driving the first rear wheel 108 and the second rear wheel 110 in reverse. In this manner, the net torque on the vehicle 100 causes the vehicle 100 to perform a clockwise tank turn.

Alternatively, in the event the turn manager 102 determines that the desired tank turn is a clockwise tank turn, the turn manager 102 engages example brakes 118, 120 of the first front wheel 104 and the second rear wheel 110, respectively. Additionally, the turn manager 102 is configured to decrease a suspension load of example suspensions 122, 124 of the first front wheel 104 and the second rear wheel 110, respectively. In addition to engaging the example brakes 118, 120 and decreasing the suspension load of the suspensions 122, 124, the turn manager 102 is configured to drive the first motor 112 in reverse, thus driving the first front wheel 104 and the second front wheel 106 in reverse. Additionally, the turn manager 102 is configured to drive the second motor 114 forward, thus driving the first rear wheel 108 and the second rear wheel 110 forward. In this manner, the net torque on the vehicle 100 causes the vehicle 100 to perform a clockwise tank turn.

In another example, a user of the vehicle 100 may select, via the display 116, to perform a counterclockwise tank turn. In the event the turn manager 102 determines that the desired tank turn is a counterclockwise tank turn, the turn manager 102 engages example brakes 118, 120 of the first front wheel 104 and the second rear wheel 110, respectively. Additionally, the turn manager 102 is configured to decrease a suspension load of example suspensions 122, 124 of the first front wheel 104 and the second rear wheel 110, respectively.

In addition to engaging the example brakes 118, 120 and decreasing the suspension load of the suspensions 122, 124, the turn manager 102 is configured to drive the first motor 112 forward, thus driving the first front wheel 104 and the second front wheel 106 forward. Additionally, the turn manager 102 is configured to drive the second motor 114 in reverse, thus driving the first rear wheel 108 and the second rear wheel 110 in reverse. In this manner, the net torque on the vehicle 100 causes the vehicle 100 to perform a counterclockwise tank turn.

In yet another example, in the event the turn manager 102 determines that the desired tank turn is a counterclockwise tank turn, the turn manager 102 engages example brakes 126, 128 of the second front wheel 106 and the first rear wheel 108, respectively. Additionally, the turn manager 102 is configured to decrease a suspension load of example suspensions 130, 132 of the second front wheel 106 and the first rear wheel 108, respectively. In addition to engaging the example brakes 126, 128 and decreasing the suspension load of the suspensions 130, 132, the turn manager 102 is configured to drive the first motor 112 in reverse, thus driving the first front wheel 104 and the second front wheel 106 in reverse. Additionally, the turn manager 102 is configured to drive the second motor 114 forward, thus driving the first rear wheel 108 and the second rear wheel 110 forward. In this manner, the net torque on the vehicle 100 causes the vehicle 100 to perform a counterclockwise tank turn.

In the illustrated example, the turn manager 102 is operatively coupled to the brakes 118, 120, 126, 128. Accordingly, the turn manager 102 is configured to determine the engagement of the brakes 118, 120, 126, 128. For example, the turn manager 102 can determine whether a brake of the brakes 118, 120, 126, 128 is engaged or disengaged. Additionally, the turn manager 102 can adjust the engagement of the brakes 118, 120, 126, 128 by engaging or disengaging at least one of the brakes 118, 120, 126, 128. In examples disclosed herein, the brakes 118, 120, 126, 128 may be implemented using any suitable vehicular braking apparatus and/or mechanism such as, for example, a disc brake, a drum brake, etc.

In some examples, the front axle and/or the rear axle are locked. For example, in response to the front axle being locked, the first front wheel 104 and the second front wheel 106 are configured to rotate together (e.g., at the same speed and/or in the same direction). Similarly, in response to the rear axle being locked, the first rear wheel 108 and the second rear wheel 110 are configured to rotate together. As such, engaging at least one of the brakes 118, 120 of the front axle stops and/or slows rotation of both the first front wheel 104 and the second front wheel 106, and engaging at least one of the brakes 126, 128 of the rear axle stops and/or slows rotation of both the first rear wheel 108 and the second rear wheel 110. Accordingly, in response to the front axle and/or the rear axle being locked, the turn manager 102 does not engage the brakes 118, 120, 126, 128 to perform a tank turn.

For example, in response to the turn manager 102 determining that the desired tank turn is a clockwise tank turn and that the front axle and/or the rear axle are locked, the turn manager 102 does not engage the example brakes 118, 120 of the first front wheel 104 and the second rear wheel 110, respectively. Additionally, the turn manager 102 is configured to decrease a suspension load of example suspensions 122, 124 of the first front wheel 104 and the second rear wheel 110, respectively. In such examples, the turn manager 102 drives the first motor 112 in reverse, thus driving the first front wheel 104 and the second front wheel 106 in reverse at the same speed. Additionally, the turn manager 102 drives the second motor 114 forward, thus driving the first rear wheel 108 and the second rear wheel 110 forward at the same speed. Thus, the turn manager 102 can reduce traction between a road surface and the first front wheel 104 and/or between the road surface and the second rear wheel 110. Accordingly, in such examples, the first front wheel 104 and/or the second rear wheel 110 can skid along the road surface. As such, the vehicle 100 can perform a clockwise tank turn without braking of the first front wheel 104 and the second rear wheel 110.

Alternatively, in response to the turn manager 102 determining that the desired tank turn is a clockwise tank turn and that the front axle and/or the rear axle are locked, the turn manager 102 does not engage the example brakes 126, 128 of the second front wheel 106 and the first rear wheel 108, respectively. Additionally, the turn manager 102 is configured to decrease a suspension load of example suspensions 130, 132 of the second front wheel 106 and the first rear wheel 108, respectively. In such examples, the turn manager 102 drives the first motor 112 forward, thus driving the first front wheel 104 and the second front wheel 106 forward at the same speed. Additionally, the turn manager 102 drives the second motor 114 in reverse, thus driving the first rear wheel 108 and the second rear wheel 110 in reverse at the same speed. Thus, the turn manager 102 can reduce traction between a road surface and the second front wheel 106 and/or between the road surface and the first rear wheel 108. Accordingly, in such examples, the second front wheel 106 and/or the first rear wheel 108 can skid along the road surface. As such, the vehicle 100 can perform a clockwise tank turn without braking of the second front wheel 106 and the first rear wheel 108.

In other examples, in response to the turn manager 102 determining that the desired tank turn is a counterclockwise tank turn and that the front axle and/or the rear axle are locked, the turn manager 102 does not engage the example brakes 126, 128 of the second front wheel 106 and the first rear wheel 108, respectively. Additionally, the turn manager 102 is configured to decrease a suspension load of example suspensions 130, 132 of the second front wheel 106 and the first rear wheel 108, respectively. In such examples, the turn manager 102 drives the first motor 112 in reverse, thus driving the first front wheel 104 and the second front wheel 106 in reverse at the same speed. Furthermore, the turn manager 102 drives the second motor 114 forward, thus driving the first rear wheel 108 and the second rear wheel 110 forward at the same speed. Thus, in response to driving the second front wheel 106 and the first rear wheel 108, the turn manager 102 can reduce traction between the road surface and the second front wheel 106 and/or between the road surface and the first rear wheel 108. Accordingly, in such examples, the second front wheel 106 and/or the first rear wheel 108 can skid along the road surface. As such, the vehicle 100 can perform a counterclockwise tank turn without braking of the second front wheel 106 and the first rear wheel 108.

Alternatively, in response to the turn manager 102 determining that the desired tank turn is a counterclockwise tank turn and that the front axle and/or the rear axle are locked, the turn manager 102 does not engage the example brakes 118, 120 of the first front wheel 104 and the second rear wheel 110, respectively. Additionally, the turn manager 102 is configured to decrease a suspension load of example suspensions 122, 124 of the first front wheel 104 and the second rear wheel 110, respectively. In such examples, the turn manager 102 drives the first motor 112 forward, thus driving the first front wheel 104 and the second front wheel 106 forward at the same speed. Additionally, the turn manager 102 drives the second motor 114 in reverse, thus driving the first rear wheel 108 and the second rear wheel 110 in reverse at the same speed. Thus, the turn manager 102 can reduce traction between a road surface and the first front wheel 104 and/or between the road surface and the second rear wheel 110. Accordingly, in such examples, the first front wheel 104 and/or the second rear wheel 110 can skid along the road surface. As such, the vehicle 100 can perform a counterclockwise tank turn without braking of the first front wheel 104 and the second rear wheel 110.

In the illustrated example, the turn manager 102 is also operatively coupled to the suspensions 122, 124, 130, 132. Accordingly, the turn manager 102 is configured to determine the load of the suspension 122, 124, 130, 132. For example, the turn manager 102 can determine the distance that at least one of the suspensions 122, 124, 130, 132 is retracted or extended. Additionally, the turn manager 102 can adjust the load of the suspensions 122, 124, 130, 132 by retracting or extending at least one of the suspensions 122, 124, 130, 132. In the example of FIG. 1, the suspensions 122, 124, 130, 132 are air bag suspensions including a flexible bellow. Accordingly, to decrease a suspension load, the turn manager 102 may indicate to remove air from a flexible bellow of at least one of the corresponding suspensions 122, 124, 130, 132. Likewise, to increase a suspension load, the turn manager 102 may indicate to pump air into a flexible bellow of at least one of the corresponding suspensions 122, 124, 130, 132. Additional description of an example suspension of the suspensions 122, 124, 130, 132 is described below, in connection with FIG. 2. In other examples disclosed herein, any of the suspensions 122, 124, 130, 132 may be implemented using any suitable suspension apparatus and/or mechanism such as, for example, a MacPherson strut suspension, a swing axle suspension, a leaf and spring suspension, etc. In some examples, the suspensions 122, 124, 130, 132 can be fully independent air suspensions such that each of the suspensions 122, 124, 130, 132 can be independently controlled by the turn manager 102.

Figure 2:
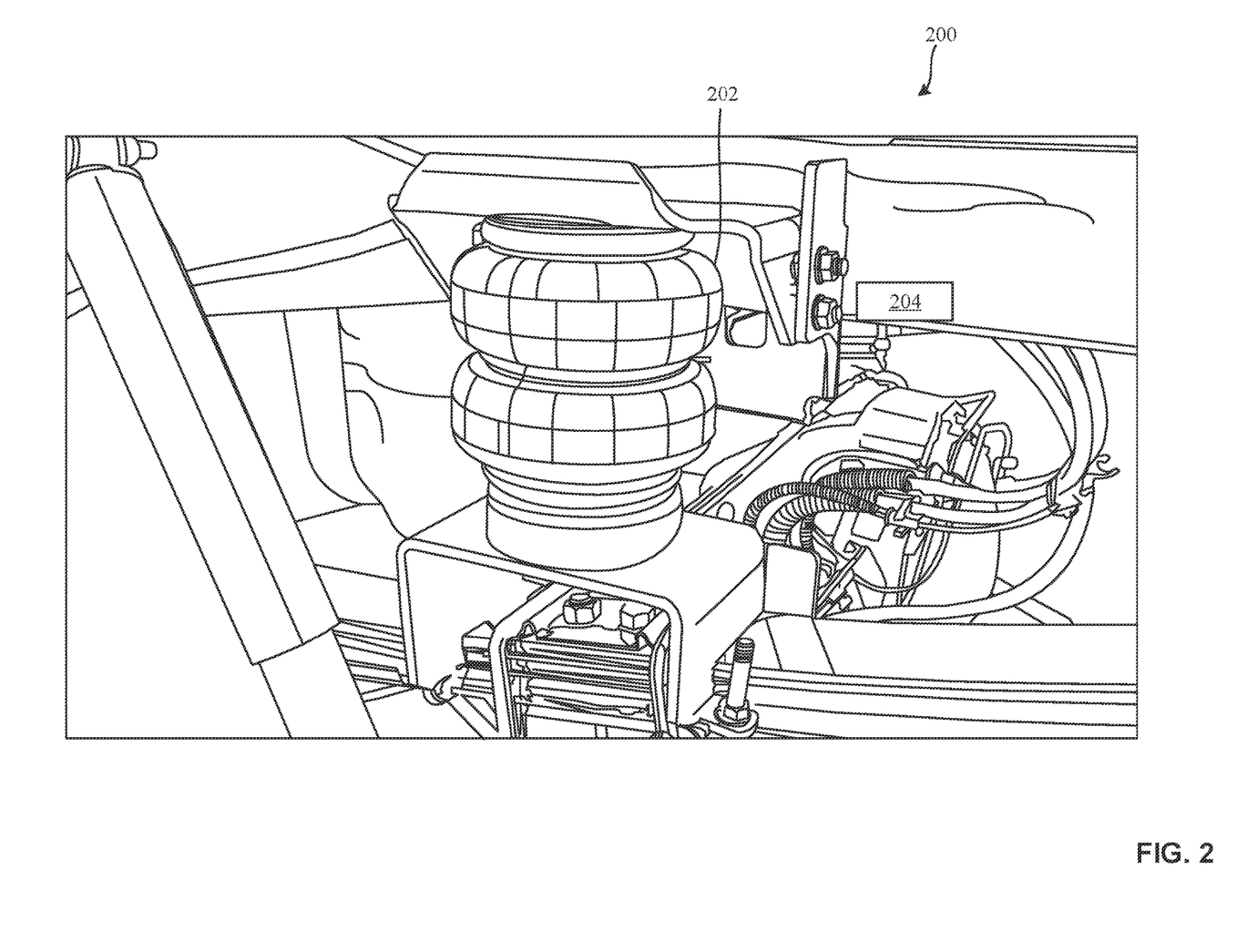
FIG. 2 illustrates an example suspension including an example flexible bellow and an example pump.

FIG. 2 illustrates an example suspension 200 including an example flexible bellow 202 and an example pump 204. In FIG. 2, the suspension 200 may correspond to any of the suspensions 122, 124, 130, 132 of FIG. 1. The suspension 200 is an air-bag suspension coupled to a wheel. For example, the suspension 200 may be coupled to any of the first front wheel 104, the second front wheel 106, the first rear wheel 108, or the second rear wheel 110.

In operation, a controller (e.g., the turn manager 102 of FIG. 1) may indicate to the pump 204 to increase or decrease the air pressure within the flexible bellow 202. For example, to decrease a suspension load of the suspension 200, the controller (e.g., the turn manager 102) may indicate to the pump 204 to remove air from (e.g., decrease air pressure in) the flexible bellow 202. Alternatively, to increase a suspension load of the suspension 200, the controller (e.g., the turn manager 102) may indicate to the pump 204 to pump air into (e.g., increase air pressure in) the flexible bellow 202.

Figure 3:
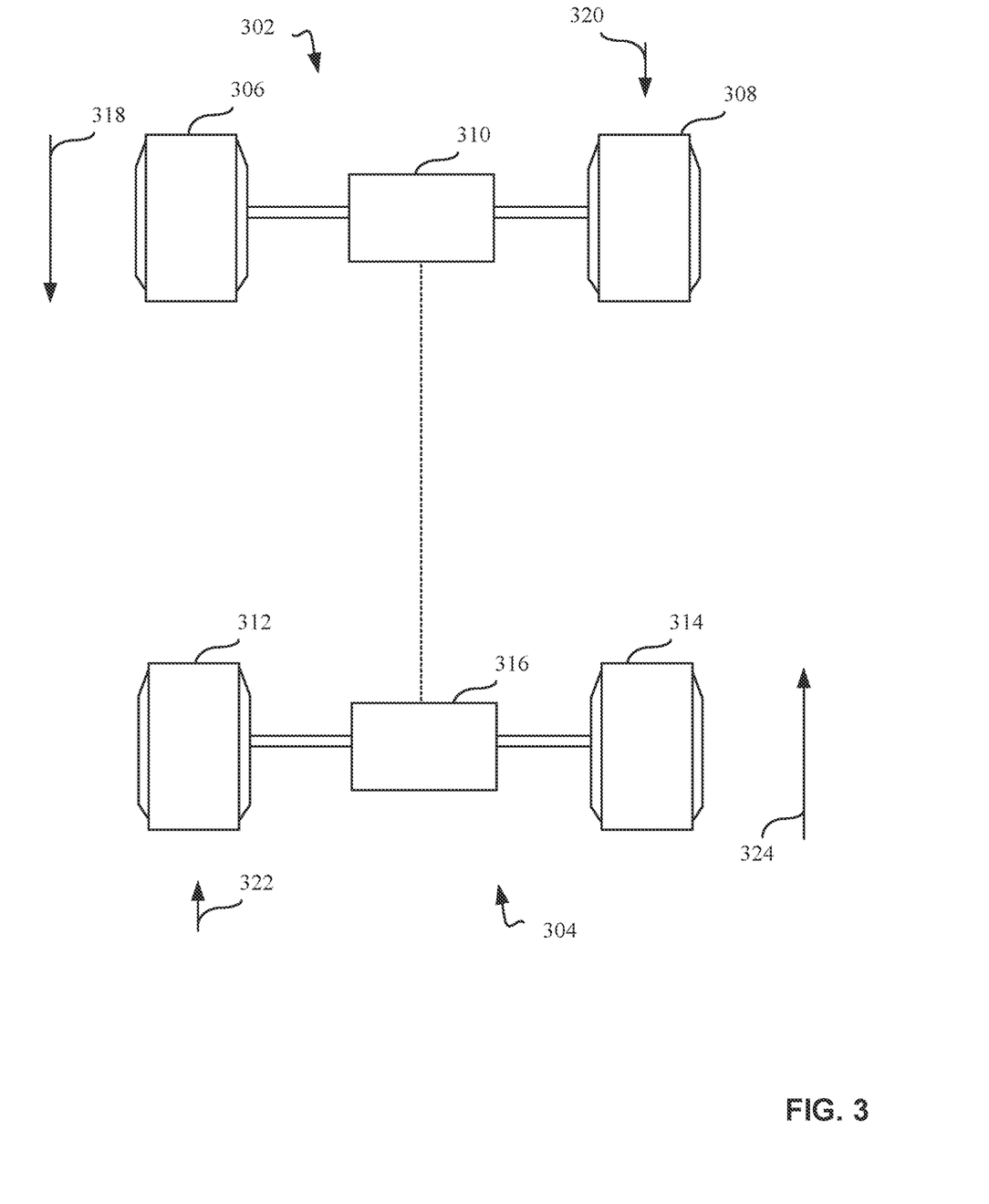
FIG. 3 depicts an example first axle and an example second axle.

FIG. 3 depicts a first example axle 302 and a second example axle 304. In FIG. 3, the first axle 302 includes a first wheel 306 coupled to a first end of the first axle 302 and an example second wheel 308 coupled to a second end of the first axle 302. For example, the first wheel 306 may correspond to the first front wheel 104 of FIG. 1. Likewise, the second wheel 308 may correspond to the second front wheel 106 of FIG. 1. In FIG. 3, the first axle 302 is coupled to a first motor 310. The first motor 310 is an electric motor. The first motor 310 may correspond to the example first motor 112 of FIG. 1.

In FIG. 3, the second axle 304 includes a third wheel 312 coupled to a first end of the second axle 304 and an example fourth wheel 314 coupled to a second end of the second axle 304. For example, the third wheel 312 may correspond to the first rear wheel 108 of FIG. 1. Likewise, the fourth wheel 314 may correspond to the second rear wheel 110 of FIG. 1. In FIG. 3, the second axle 304 is coupled to a second motor 316. The second motor 316 is an electric motor. The second motor 316 may correspond to the example second motor 114 of FIG. 1.

For illustration purposes, FIG. 3 includes example force indicators. For examples, the illustration of FIG. 3 includes a first force indicator 318 indicating a net force direction of the first wheel 306, a second force indicator 320 indicating a net force direction of the second wheel 308, a third force indicator 322 indicating a net force direction of the third wheel 312, and a fourth force indicator 324 indicating a net force direction of the fourth wheel 314.

The first force indicator 318, the second force indicator 320, the third force indicator 322, and the fourth force indicator 324 illustrate a net direction of force as a result of (a) causing the first motor 310 to drive the first wheel 306 and the second wheel 308 in a reverse direction, (b) causing the second motor 316 to drive the third wheel 312 and the fourth wheel 314 in a forward direction, (c) engaging a brake associated with the second wheel 308, (d) engaging a brake associated with the third wheel 312, (e) decreasing a suspension load of the second wheel 308, and (f) decreasing a suspension load of the third wheel 312.

For example, in response to decreasing the suspension loads associated with the second wheel 308 and the third wheel 312, a load on the first wheel 306 and the fourth wheel 314 is larger compared to a load on the second wheel 308 and the third wheel 312. Additionally, the coefficient of friction is the same across the wheels 306, 308, 312, 314. As such, first traction forces associated with the first wheel 306 and the fourth wheel 314 are larger compared to second traction forces associated with the second wheel 308 and the third wheel 312. In some examples, the first traction forces and/or the second traction forces are based on rotation speed and/or suspension loads of the wheels 306, 308, 312, 314.

In the illustrated example of FIG. 3, the first force indicator 318 and the fourth force indicator 324 correspond to the first traction forces in the counterclockwise direction. Alternatively, the second force indicator 320 and the third force indicator 322 correspond to the second traction forces in the clockwise direction. In the illustrated example of FIG. 3, lengths of the force indicators 318, 320, 322, 324 correspond to magnitudes of the first traction forces and/or the second traction forces on the respective wheels 306, 308, 312, 314. In the illustrated example of FIG. 3, the magnitudes of the first force indicator 318 and the fourth force indicator 324 are larger than the magnitudes of the second force indicator 320 and the third force indicator 322. Accordingly, a net force is in the counterclockwise direction. In this manner, the net torque is exerted in a counterclockwise direction such that a configuration of the front axle 302 and the rear axle 304 in the illustrated example of FIG. 3 can be used to perform a counterclockwise tank turn.

Figure 4:
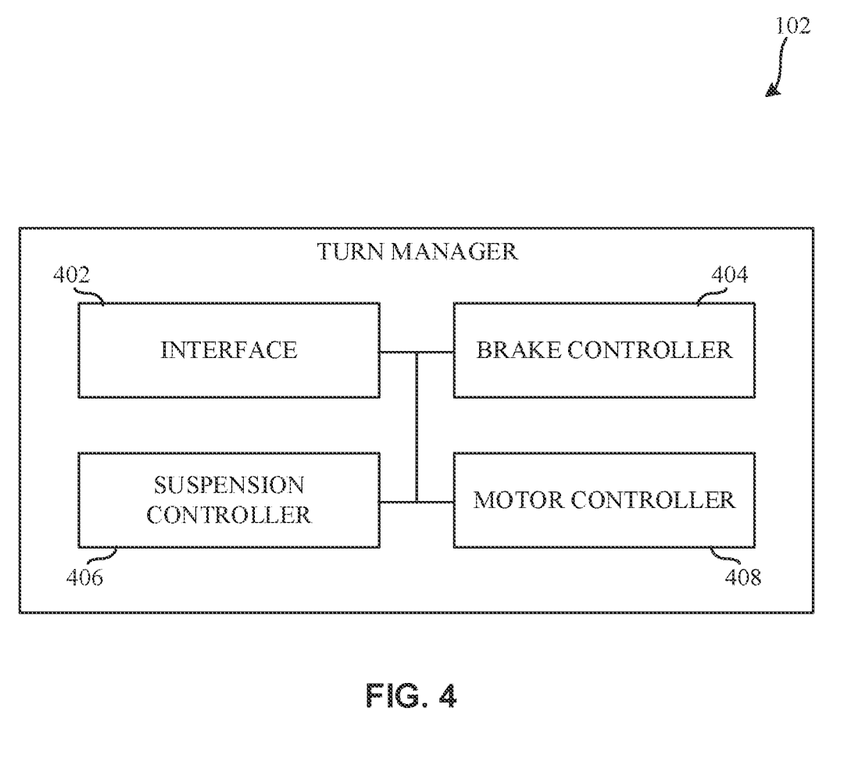
FIG. 4 is a block diagram illustrating the example turn manager of FIG. 1.

FIG. 4 is a block diagram illustrating the example turn manager 102 of FIG. 1. The turn manager 102 includes an example interface 402, an example brake controller 404, an example suspension controller 406, and an example motor controller 408. The example interface 402 is configured to communicate with the display 116 to obtain an indication of whether to perform a tank turn. In response to determining that a user of the vehicle 100 has indicated to perform a tank turn, the interface 402 determines whether the desired tank turn is a clockwise tank turn, or a counterclockwise tank-turn. For example, a user of the vehicle 100 may select, via the display 116, to perform a clockwise tank turn. In the event the interface 402 determines that the desired tank turn is a clockwise tank turn, the interface 402 communicates with the brake controller 404, the suspension controller 406, and the motor controller 408 to indicate that the desired tank turn is a clockwise tank turn. In the event the interface 402 determines that the desired tank turn is a counterclockwise tank turn, the interface 402 communicates with the brake controller 404, the suspension controller 406, and the motor controller 408 to indicate that the desired tank turn is a counterclockwise tank turn. The example interface 402 of the illustrated example of FIG. 4 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc.

The brake controller 404 is configured to communicate with the interface 402 to facilitate engagement of one or more brakes (e.g., the brakes 118, 120, 126, 128 of FIG. 1) in response to an indication to perform a tank turn is obtained. The brake controller 404 is communicatively coupled to the brakes 118, 120, 126, 128 of FIG. 1. In the event the interface 402 determines that the desired tank turn is a clockwise tank turn, the brake controller 404 engages example brakes 118, 120 of the first front wheel 104 and the second rear wheel 110, respectively, of FIG. 1. In the event the interface 402 determines that the desired tank turn is a counterclockwise tank turn, the brake controller 404 engages example brakes 126, 128 of the second front wheel 106 and the first rear wheel 108, respectively, of FIG. 1. The example brake controller 404 of the illustrated example of FIG. 4 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc.

The suspension controller 406 is configured to communicate with the interface 402 to facilitate engagement of one or more suspensions (e.g., the suspensions 122, 124, 130, 132 of FIG. 1) in response to an indication to perform a tank turn is obtained. The suspension controller 406 is communicatively coupled to the suspensions 122, 124, 130, 132 of FIG. 1. In the event the interface 402 determines that the desired tank turn is a clockwise tank turn, the suspension controller 406 is configured to decrease a suspension load of example suspensions 122, 124 of the first front wheel 104 and the second rear wheel 110, respectively, of FIG. 1. In the event the interface 402 determines that the desired tank turn is a counterclockwise tank turn, the suspension controller 406 is configured to decrease a suspension load of example suspensions 130, 132 of the second front wheel 106 and the first rear wheel 108, respectively, of FIG. 1. The example suspension controller 406 of the illustrated example of FIG. 4 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc.

The motor controller 408 is configured to communicate with the interface 402 to facilitate engagement of one or more motors (e.g., the motors 112, 114 of FIG. 1) in response to an indication to perform a tank turn is obtained. The motor controller 408 is communicatively coupled to the motors 112, 114 of FIG. 1. In the event the interface 402 determines that the desired tank turn is a clockwise tank turn, the motor controller 408 is configured to drive the first motor 112 in reverse, thus driving the first front wheel 104 and the second front wheel 106 in reverse. Additionally, the motor controller 408 is configured to drive the second motor 114 forward, thus driving the first rear wheel 108 and the second rear wheel 110 forward. In this manner, along with the engagement of the example brakes 118, 120 of the first front wheel 104 and the second rear wheel 110, respectively, and the decrease in suspension load of example suspensions 122, 124 of the first front wheel 104 and the second rear wheel 110, respectively, the net torque on the vehicle 100 causes the vehicle 100 to perform a clockwise tank turn.

In the event the interface 402 determines that the desired tank turn is a counterclockwise tank turn, the motor controller 408 is configured to drive the first motor 112 in reverse, thus driving the first front wheel 104 and the second front wheel 106 in reverse. Additionally, the motor controller 408 is configured to drive the second motor 114 forward, thus driving the first rear wheel 108 and the second rear wheel 110 forward. In this manner, along with the engagement of the example brakes 126, 128 of the second front wheel 106 and the first rear wheel 108, respectively, and the decrease in suspension load of example suspensions 130, 132 of the second front wheel 106 and the first rear wheel 108, respectively, the net torque on the vehicle 100 causes the vehicle 100 to perform a counterclockwise tank turn. The example motor controller 408 of the illustrated example of FIG. 4 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc.

While an example manner of implementing the turn manager 102 of FIG. 1 is illustrated in FIG. 4, one or more of the elements, processes and/or devices illustrated in FIG. 4 may be combined, divided, re-arranged, omitted, eliminated and/or implemented in any other way. Further, the example interface 402, the example brake controller 404, the example suspension controller 406, the example motor controller 408, and/or, more generally, the example turn manager 102 of FIG. 4 may be implemented by hardware, software, firmware and/or any combination of hardware, software and/or firmware. Thus, for example, any of the example interface 402, the example brake controller 404, the example suspension controller 406, the example motor controller 408, and/or, more generally, the example turn manager 102 of FIG. 4 could be implemented by one or more analog or digital circuit(s), logic circuits, programmable processor(s), programmable controller(s), graphics processing unit(s) (GPU(s)), digital signal processor(s)

(DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example interface 402, the example brake controller 404, the example suspension controller 406, and/or the example motor controller 408 is/are hereby expressly defined to include a non-transitory computer readable storage device or storage disk such as a memory, a digital versatile disk (DVD), a compact disk (CD), a Blu-ray disk, etc. including the software and/or firmware. Further still, the example motor controller 102 of FIG. 4 may include one or more elements, processes and/or devices in addition to, or instead of, those illustrated in FIG. 4, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 5:
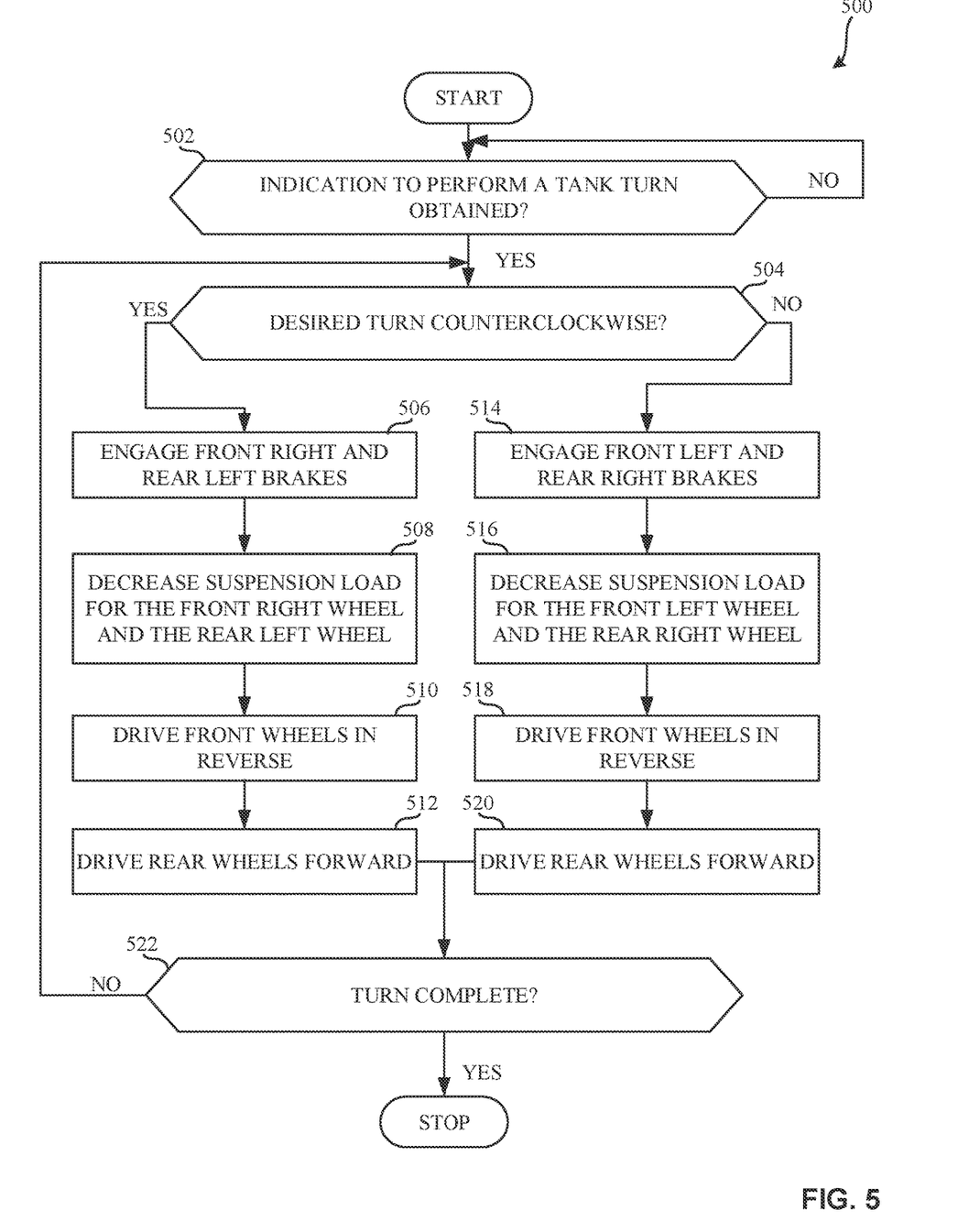
FIG. 5 is a flowchart representative of example machine readable instructions which may be executed to implement the turn manager of FIGS. 1 and/or 4.

A flowchart representative of example hardware logic, machine readable instructions, hardware implemented state machines, and/or any combination thereof for implementing the turn manager 102 of FIGS. 1 and/or 4 is shown in FIG. 5. The machine readable instructions may be one or more executable programs or portion(s) of an executable program for execution by a computer processor and/or processor circuitry, such as the processor 612 shown in the example processor platform 600 discussed below in connection with FIG. 6. The program may be embodied in software stored on a non-transitory computer readable storage medium such as a CD-ROM, a floppy disk, a hard drive, a DVD, a Blu-ray disk, or a memory associated with the processor 612, but the entire program and/or parts thereof could alternatively be executed by a device other than the processor 612 and/or embodied in firmware or dedicated hardware. Further, although the example program is described with reference to the flowchart illustrated in FIG. 5, many other methods of implementing the example turn manager 102 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example processes of FIG. 5 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 5 is a flowchart representative of example machine readable instructions 500 which may be executed to implement the turn manager 102 of FIGS. 1 and/or 4. At block 502, the example turn manager 102 (FIG. 1) determines whether an indication to perform a tank turn is obtained. (Block 502). In examples disclosed herein, the example interface 402 (FIG. 4) is configured to communicate with the display 116 to determine whether an indication to perform a tank turn is obtained. In the event the interface 402 determines that an indication to perform a tank turn is not obtained (e.g., the control of block 502 returns a result of NO), the process waits.

Alternatively, in the event the interface 402 determines that an indication to perform a tank turn is obtained (e.g., the control of block 502 returns a result of YES), the turn manager 102 determines whether the desired turn is a counterclockwise turn. (Block 504). In examples disclosed herein, the interface 402 determines whether the desired tank turn is a counterclockwise tank turn. For example, a user of the vehicle 100 may select, via the display 116, to perform a counterclockwise tank turn.

In the event the interface 402 determines that the desired tank turn is a counterclockwise tank turn (e.g., the control of block 504 returns a result of YES), the turn manager 102 engages example front right and rear left brakes of a vehicle. (Block 506). In examples disclosed herein, the brake controller 404 (FIG. 4) engages example brakes 126, 128 of the second front wheel 106 and the first rear wheel 108, respectively, of FIG. 1. In an alternate example, the brake controller 404 engages the example brakes 118, 120 of the first front wheel 104 and the second rear wheel 110, respectively, of FIG. 1. In some examples, in response to the front axle and/or the rear axle being locked, the brake controller 404 does not engage the brakes 118, 120, 126, 128.

At block 508, the turn manager 102 decreases the suspension load of the front right wheel and the rear left wheel. (Block 508). In examples disclosed herein, the suspension controller 406 (FIG. 4) is configured to decrease a suspension load of example suspensions 130, 132 of the second front wheel 106 and the first rear wheel 108, respectively, of FIG. 1. In the alternate example, the brake suspension controller 406 is configured to decrease a suspension load of example suspensions 122, 124 of the first front wheel 104 and the second rear wheel 110, respectively, of FIG. 1.

At block 510, the turn manager 102 drives the front wheels in reverse. (Block 510). In examples disclosed herein, the motor controller 408 (FIG. 4). is configured to drive the first motor 112 in reverse, thus driving the first front wheel 104 and the second front wheel 106 in reverse. In the alternate example, the motor controller 408 is configured to drive the first motor 112 forward, thus driving the first front wheel 104 and the second front wheel 106 forward.

At block 512, the turn manager 102 drives the rear wheels forward. (Block 512). In examples disclosed herein, the motor controller 408 is configured to drive the second motor 114 forward, thus driving the first rear wheel 108 and the second rear wheel 110 forward. In the alternate example, the motor controller 408 is configured to drive the second motor 114 in reverse, thus driving the first rear wheel 108 and the second rear wheel 110 in reverse.

Turning back to block 504, in the event the interface determines that the desired turn is not a counterclockwise turn (e.g., the control of block 504 returns a result of NO), the turn manager engages example front left and rear right brakes of a vehicle. (Block 514). In examples disclosed herein, the brake controller 404 engages example brakes 118, 120 of the first front wheel 104 and the second rear wheel 110, respectively, of FIG. 1. In an alternate example, the brake controller 404 engages the example brakes 126, 128 of the second front wheel 106 and the first rear wheel 108, respectively, of FIG. 1. In some examples, in response to the front axle and/or the rear axle being locked, the brake controller 404 does not engage the brakes 118, 120, 126, 128.

At block 516, the turn manager 102 decreases the suspension load of the front left wheel and the rear right wheel. (Block 516). In examples disclosed herein, the suspension controller 406 is configured to decrease a suspension load of example suspensions 122, 124 of the first front wheel 104 and the second rear wheel 110, respectively, of FIG. 1. In the alternate example, the suspension controller 406 is configured to decrease a suspension load of example suspensions 130, 132 of the second front wheel 106 and the first rear wheel 108, respectively.

At block 518, the turn manager 102 drives the front wheels in reverse. (Block 518). In examples disclosed herein, the motor controller 408 is configured to drive the first motor 112 in reverse, thus driving the first front wheel 104 and the second front wheel 106 in reverse. In the alternate example, the motor controller 408 is configured to drive the first motor 112 forward, thus driving the first front wheel 104 and the second front wheel 106 forward.

At block 520, the turn manager 102 drives the rear wheels forward. (Block 520). In examples disclosed herein, the motor controller 408 is configured to drive the second motor 114 forward, thus driving the first rear wheel 108 and the second rear wheel 110 forward. In the alternate example, the motor controller 408 is configured to drive the second motor 114 in reverse, thus driving the first rear wheel 108 and the second rear wheel 110 in reverse.

In response to the execution of the instructions represented by block 512 or block 520, the turn manager 102 is configured to determine whether the turn is complete. (Block 522). In examples disclosed herein, the interface 402 determines whether the turn is complete.

In the event the interface 402 determines that the turn is not complete (e.g., the control of block 522 returns a result of NO), the process returns to block 504. Alternatively, in the event the interface 402 determines that the turn is complete (e.g., the control of block 522 returns a result of YES), the process stops.

Figure 6:
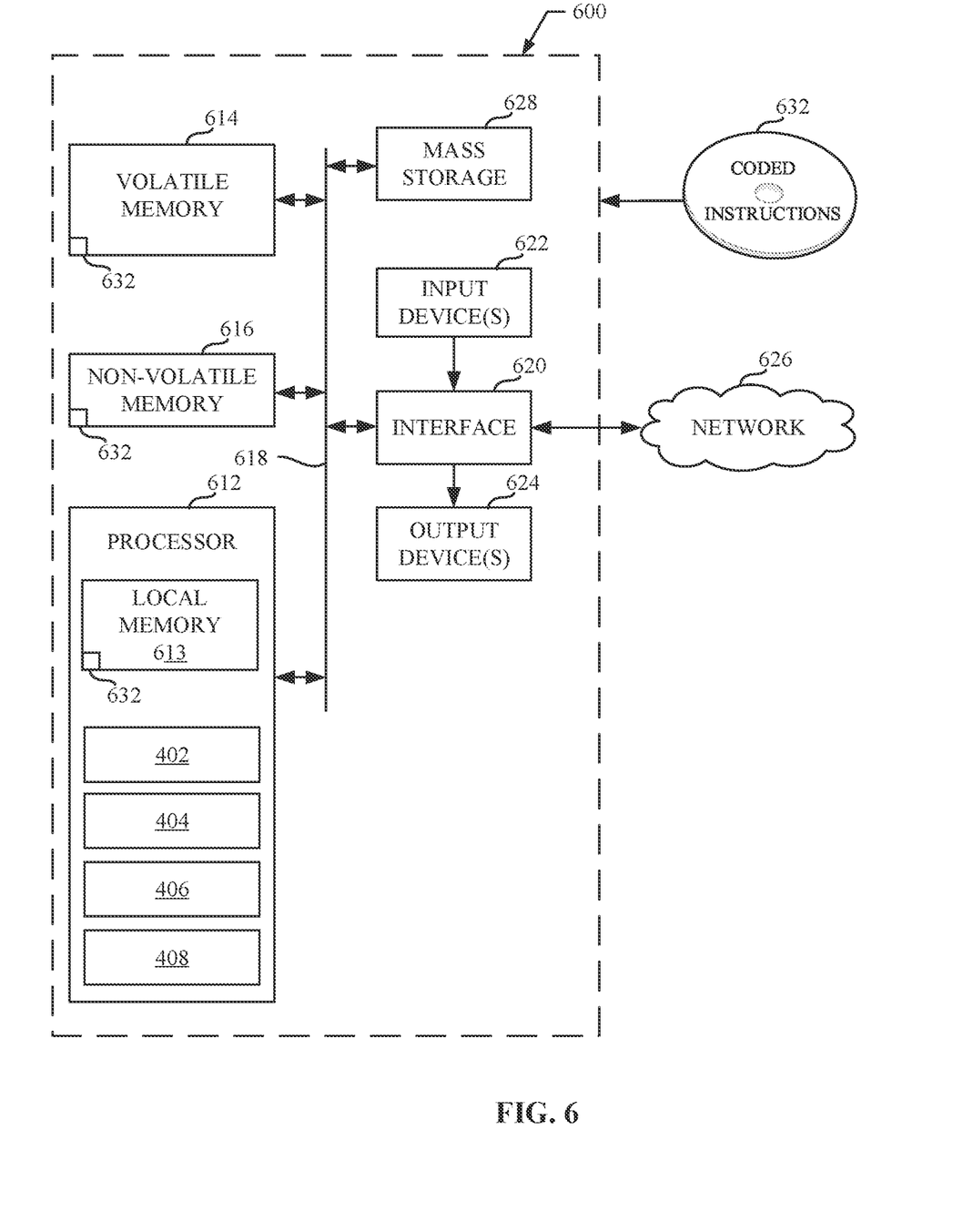
FIG. 6 is a block diagram of an example processor platform structured to execute the instructions of FIG. 5 to implement the turn manager of FIGS. 1, and/or 4.

FIG. 6 is a block diagram of an example processor platform 600 structured to execute the instructions of FIG. 5 to implement the turn manager 102 of FIG. 1. The processor platform 600 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a headset or other wearable device, or any other type of computing device.

The processor platform 600 of the illustrated example includes a processor 612. The processor 612 of the illustrated example is hardware. For example, the processor 612 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example interface 402, the example brake controller 404, the example suspension controller 406, and the example motor controller 408.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), a Bluetooth® interface, a near field communication (NFC) interface, and/or a PCI express interface.

In the illustrated example, one or more input devices 622 are connected to the interface circuit 620. The input device(s) 622 permit(s) a user to enter data and/or commands into the processor 612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output devices 1024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), and/or a tactile output device. The interface circuit 620 of the illustrated example, thus, typically includes a graphics driver card, a graphics driver chip and/or a graphics driver processor.

The interface circuit 620 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 626. The communication can be via, for example, an Ethernet connection, a digital subscriber line (DSL) connection, a telephone line connection, a coaxial cable system, a satellite system, a line-of-site wireless system, a cellular telephone system, etc.

The processor platform 600 of the illustrated example also includes one or more mass storage devices 628 for storing software and/or data. Examples of such mass storage devices 628 include floppy disk drives, hard drive disks, compact disk drives, Blu-ray disk drives, redundant array of independent disks (RAID) systems, and digital versatile disk (DVD) drives.

The machine executable instructions 632 of FIG. 5 may be stored in the mass storage device 628, in the volatile memory 614, in the non-volatile memory 616, and/or on a removable non-transitory computer readable storage medium such as a CD or DVD.

From the foregoing, it will be appreciated that example methods, apparatus and articles of manufacture have been disclosed that enable a vehicle to perform a tank turn. The disclosed methods, apparatus and articles of manufacture improve the efficiency of using a computing device by facilitating a tank turn in a vehicle including two electric motors to drive a front axle and a rear axle, respectively. The disclosed methods, apparatus and articles of manufacture are accordingly directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

Example methods, apparatus, systems, and articles of manufacture to perform a tank turn are disclosed herein. Further examples and combinations thereof include the following:

Example 1 includes a vehicle comprising a first wheel and a second wheel, the first wheel located on an end of a first axle, the second wheel located on an end of a second axle, the end of the first axle opposite to the end of the second axle, a first suspension coupled to the first wheel, a second suspension coupled to the second wheel, and a controller to drive the first axle in a first direction, drive the second axle in a second direction, the first direction different from the second direction, and decrease a first suspension load of the first suspension and a second suspension load of the second suspension.

Example 2 includes the vehicle of Example 1, wherein the first suspension includes a first flexible bellow, the second suspension includes a second flexible bellow.

Example 3 includes the vehicle of Example 2, wherein the controller is to decrease the first suspension load and the second suspension load by indicating to a first pump to remove air from the first flexible bellow, and indicating to a second pump to remove air from the second flexible bellow.

Example 4 includes the vehicle of Example 1, wherein the controller is to decrease the first suspension load and the second suspension load in response to determining that (a) a first brake associated with the first wheel is engaged and (b) a second brake associated with the second wheel is engaged.

Example 5 includes the vehicle of Example 4, further including a graphical user interface to display a button that, when selected, indicates to the controller to determine whether the first brake associated with the first wheel is engaged, and determine whether the second brake associated with the second wheel is engaged.

Example 6 includes the vehicle of Example 1, further including a first motor to drive the first axle and a second motor to drive the second axle.

Example 7 includes the vehicle of Example 6, wherein the first motor and the second motor are electric motors.

Example 8 includes the vehicle of Example 1, wherein the end of the first axle is a first end of the first axle, the end of the second axle is a first end of the second axle, the vehicle further including a third wheel located on a second end of the first axle, the third wheel coupled to a third suspension, and a fourth wheel located on a second end of the second axle, the fourth wheel coupled to a fourth suspension, the second end of the first axle opposite to the second end of the second axle.

Example 9 includes the vehicle of Example 8, wherein the controller is to in response to determining (a) a third brake associated with the third wheel is disengaged and (b) a fourth brake associated with the fourth wheel is disengaged, increase a third suspension load of the third suspension and a fourth suspension load of the fourth suspension.

Example 10 includes the vehicle of Example 1, further including a first motor to drive the first wheel in the first direction, and a second motor to drive the second wheel in the second direction.

Example 11 includes a non-transitory computer readable medium comprising instructions which, when executed, cause at least one processor to determine whether an indication to perform a tank turn is obtained, and in response to determining the indication to perform the tank turn is obtained decrease a first suspension load of a first suspension coupled to a first wheel, and decrease a second suspension load of a second suspension coupled to a second wheel, the first wheel located on an end of a first axle, the second wheel located on an end of a second axle, the end of the first axle opposite to the end of the second axle.

Example 12 includes the non-transitory computer readable medium of Example 11, wherein the instructions, when executed, cause the at least one processor to decrease the first suspension load and the second suspension load by indicating to a first pump to remove air from a first flexible bellow of the first suspension, and indicating to a second pump to remove air from a second flexible bellow of the second suspension.

Example 13 includes the non-transitory computer readable medium of Example 11, wherein the instruction, when executed, cause the at least one processor to engage a first brake associated with the first wheel and engage a second brake associated with the second wheel.

Example 14 includes the non-transitory computer readable medium of Example 11, wherein the instruction, when executed, cause the at least one processor to drive the first wheel via a first electric motor, and drive the second wheel via a second electric motor.

Example 15 includes the non-transitory computer readable medium of Example 11, wherein the instructions, when executed, cause the at least one processor to drive the first wheel in a first direction via a first motor, and drive the second wheel in a second direction via a second motor, the first direction different from the second direction.

Example 16 includes a method comprising determining whether an indication to perform a tank turn is obtained, and in response to determining the indication to perform the tank turn is obtained decreasing a first suspension load of a first suspension coupled to a first wheel, and decreasing a second suspension load of a second suspension coupled to a second wheel, the first wheel located on an end of a first axle, the second wheel located on an end of a second axle, the end of the first axle opposite to the end of the second axle.

Example 17 includes the method of Example 16, further including decreasing the first suspension load and the second suspension load by indicating to a first pump to remove air from a first flexible bellow of the first suspension, and indicating to a second pump to remove air from a second flexible bellow of the second suspension.

Example 18 includes the method of Example 16, further including engaging a first brake associated with the first wheel and engaging a second brake associated with the second wheel.

Example 19 includes the method of Example 16, further including driving the first wheel via a first electric motor, and driving the second wheel via a second electric motor.

Example 20 includes the method of Example 16, further including driving the first wheel in a first direction via a first motor, and driving the second wheel in a second direction via a second motor, the first direction different from the second direction.

What is claimed is:

1. An apparatus comprising:
    memory;
    instructions; and
    programmable circuitry to execute the instructions to at least:
        determine that a first brake associated with a first wheel is engaged and a second brake associated with a second wheel is engaged, the first wheel located on an end of a first axle of a vehicle, the second wheel located on an end of a second axle of the vehicle, the end of the first axle opposite to the end of the second axle;
        cause a first suspension to decrease a first suspension load of the first wheel;
        cause a second suspension to decrease a second suspension load of the second wheel;
        cause a first motor to drive the first axle in a first direction; and
        cause a second motor to drive the second axle in a second direction, the second direction different from the first direction.

2. The apparatus of claim 1, wherein the programmable circuitry is to determine that the first and second brakes are engaged in response to an input to a graphical user interface of the vehicle.

3. The apparatus of claim 1, wherein the programmable circuitry is to cause the first brake to engage and cause the second brake to engage in response to obtaining an indication.

4. The apparatus of claim 3, wherein the programmable circuitry is to obtain the indication in response to a selection on a display of the vehicle.

5. The apparatus of claim 3, wherein the programmable circuitry is to obtain the indication in response to at least one of twisting or deflection of a lever.

6. The apparatus of claim 3, wherein the programmable circuitry is to determine a turn direction of a tank turn based on the indication.

7. The apparatus of claim 6, wherein the first wheel corresponds to a front right wheel of the vehicle and the second wheel corresponds to a rear left wheel of the vehicle when the turn direction is a counterclockwise turn direction, and the first wheel corresponds to a front left wheel of the vehicle and the second wheel corresponds to a rear right wheel of the vehicle when the turn direction is a clockwise turn direction.

8. An apparatus comprising:
brake controller circuitry to determine that a first brake associated with a first wheel is engaged and a second brake associated with a second wheel is engaged, the first wheel located on an end of a first axle of a vehicle, the second wheel located on an end of a second axle of the vehicle, the end of the first axle opposite to the end of the second axle;
suspension controller circuitry to:
cause a first suspension to decrease a first suspension load of the first wheel; and
cause a second suspension to decrease a second suspension load of the second wheel; and
motor controller circuitry to:
cause a first motor to drive the first axle in a first direction; and
cause a second motor to drive the second axle in a second direction, the second direction different from the first direction.

9. The apparatus of claim 8, wherein the brake controller circuitry is to determine that the first and second brakes are engaged in response to an input to a graphical user interface of the vehicle.

10. The apparatus of claim 8, further including interface circuitry to obtain an indication, the brake controller circuitry to cause the first brake to engage and cause the second brake to engage in response to the interface circuitry obtaining the indication.

11. The apparatus of claim 10, wherein the interface circuitry is to obtain the indication in response to a selection on a display of the vehicle.

12. The apparatus of claim 10, wherein the interface circuitry is to obtain the indication in response to at least one of twisting or deflection of a lever.

13. The apparatus of claim 10, wherein the interface circuitry is to determine a turn direction of a tank turn based on the indication.

14. The apparatus of claim 13, wherein the first wheel corresponds to a front right wheel of the vehicle and the second wheel corresponds to a rear left wheel of the vehicle when the turn direction is a counterclockwise turn direction, and the first wheel corresponds to a front left wheel of the vehicle and the second wheel corresponds to a rear right wheel of the vehicle when the turn direction is a clockwise turn direction.

15. A non-transitory computer readable medium comprising instructions which, when executed, cause programmable circuitry to:
determine that a first brake associated with a first wheel is engaged and a second brake associated with a second wheel is engaged, the first wheel located on an end of a first axle of a vehicle, the second wheel located on an end of a second axle of the vehicle, the end of the first axle opposite to the end of the second axle;
cause a first suspension to decrease a first suspension load of the first wheel;
cause a second suspension to decrease a second suspension load of the second wheel;
cause a first motor to drive the first axle in a first direction; and
cause a second motor to drive the second axle in a second direction, the second direction different from the first direction.

16. The non-transitory computer readable medium of claim 15, wherein the instructions are to cause the programmable circuitry to determine that the first and second brakes are engaged in response to an input to a graphical user interface of the vehicle.

17. The non-transitory computer readable medium of claim 15, wherein the instructions are to cause the programmable circuitry to cause the first brake to engage and cause the second brake to engage in response to obtaining an indication.

18. The non-transitory computer readable medium of claim 17, wherein the instructions are to cause the programmable circuitry to obtain the indication in response to a selection on a display of the vehicle.

19. The non-transitory computer readable medium of claim 17, wherein the instructions are to cause the programmable circuitry to obtain the indication in response to at least one of twisting or deflection of a lever.

20. The non-transitory computer readable medium of claim 17, wherein the instructions are to cause the programmable circuitry to determine a turn direction of a tank turn based on the indication.

* * * * *